(12) United States Patent
Nitsche et al.

(10) Patent No.: US 6,488,982 B1
(45) Date of Patent: Dec. 3, 2002

(54) METHOD OF PRODUCING SEPARATOR MATERIALS

(75) Inventors: Werner Nitsche, Lippstadt (DE); Norbert Lahme, Brilon (DE); Günter Sassmannshausen, Brilon (DE)

(73) Assignee: Accumulatorenwerke Hoppecke Carl Zoellner & Sohn GmbH & Co. KG (DE)

( * ) Notice: Subject to any disclaimer, the term of this patent is extended or adjusted under 35 U.S.C. 154(b) by 0 days.

(21) Appl. No.: 09/557,951

(22) Filed: Apr. 24, 2000

Related U.S. Application Data

(63) Continuation-in-part of application No. 09/029,944, filed as application No. PCT/EP97/02019 on Apr. 22, 1997, now abandoned.

(30) Foreign Application Priority Data

Jul. 9, 1996 (DE) .......................... 196 27 614

(51) Int. Cl.⁷ ............... B05D 1/18; B05D 5/12
(52) U.S. Cl. ............... 427/126.1; 427/430.1; 429/248
(58) Field of Search ........................... 427/430.1, 126.1; 429/247, 248, 251

(56) References Cited

U.S. PATENT DOCUMENTS

| 4,927,722 | A | * | 5/1990 | Bohnstedt et al. | 429/147 |
| 5,091,275 | A | * | 2/1992 | Brecht et al. | 429/247 |
| 5,204,197 | A | * | 4/1993 | Takai et al. | 429/249 |
| 5,468,572 | A | * | 11/1995 | Zguris et al. | 429/247 |
| 5,618,642 | A | * | 4/1997 | Samii et al. | 429/247 |
| 5,700,599 | A | * | 12/1997 | Danko et al. | 429/249 |

FOREIGN PATENT DOCUMENTS

| DE | 3222361 A | * | 12/1983 |
| DE | 3222361 A1 | * | 12/1983 |

* cited by examiner

*Primary Examiner*—Michael Barr
(74) *Attorney, Agent, or Firm*—R W Becker & Associates; R W Becker

(57) ABSTRACT

A method for reducing ion concentrations in separator materials used in electrochemical processes, including in lead storage batteries. The separator material is treated with at least one acid from the group of sulphuric acid, phosphoric acid and sulfonic acids and/or at least one salt from the group of sulfates, phosphates and diphosphates of the alkali metals of alkaline earth metals.

8 Claims, No Drawings

METHOD OF PRODUCING SEPARATOR MATERIALS

This application is a continuation-in-part of application Ser. No. 09/029,944, filed Mar. 9, 1998 now abandoned which is a 371 of PCT/EP97/02019 filed Apr. 22, 1997.

BACKGROUND OF THE INVENTION

The present invention relates to a method of producing separator materials for use in electrochemical processes, especially in lead storage batteries.

In electrochemical processes, especially in electrochemical energy storage processes, it is known to separate electrodes from one another by the use of separator materials. Such separator materials are chemically inert or neutral materials that are used in a porous or perforated state. For example, in the manufacture of lead storage batteries a thin sheet of polyethylene (PE foil) that is provided with silica embedments often is used as separator material.

It also is known that due to differing manufacturing processes, storage, and/or transport conditions affecting the energy storage device, ion migration or drift occurs, with the ions originating from electrodes and also diffusing, for example, into the separator material. Especially in the case of lead storage batteries, this causes a considerable deterioration of the deep discharge characteristic.

It is therefore an object of the present invention to provide a method of producing separator materials that minimizes deleterious effects of drift while also providing a reduction of the ion concentration in the separator material.

SUMMARY OF THE INVENTION

To realize this object, the method of the present invention treats the fabricated porous separator material to a treatment with at least one acid from the group of sulfuric acid, phosphoric acid and sulfonic acids and/or at least one salt from the group of sulfates, phosphates and diphosphates of the alkali metals or alkaline earth metals.

As a consequence of the inventive teaching, the manufacture of separator material for use in electrochemical processes, especially in lead storage batteries, is improved. In addition, ion concentration in the separator material can be lowered, and ion drift can be reduced.

Specifically, during manufacture of an energy storage device such as a battery, that customarily has plates, the migration of lead ions into the contact area between the separator material and the plates is limited because of reactions between lead ions from the plates and the residues formed in the pores of the separator material, residue that are substantially insoluble. The treatment of the separator material as provided in the present invention results in free acids and water soluble salts that are dispersed among the pores in the porous separator material. The residues, however, do not chemically bind with the separator material itself. Further, during operation of the battery, the residue may be dissolved by the battery electrolyte. The separator material, however, is not altered structurally or chemically by the treatment of the separator material as provided by the present invention.

A remarkable feature of the present invention is that treatment of the separator material with one of the indicated acids and/or one of the indicated salts leads to a considerable reduction of the ion concentration in the separator material, and hence yields a considerable improvement of the deep discharge characteristic of the energy storage means.

Pursuant to one specific embodiment of the present invention, the separator material is impregnated with at least one of the indicated acids or salts. It is particularly advantageous if the separator material is soaked in one of the indicated substances.

Pursuant to one particularly advantageous embodiment of the present invention, the sulfates, phosphates or diphosphates are sodium salts.

Another advantage of the present invention is that the sulfates, phosphates or diphosphates are magnesium salts.

The present invention provides a straightforward and cost-effective manufacturing process that produces a separator material that is capable of avoiding the build-up of high ion concentrations due to ion drift in electro chemically operating energy storage means. As a consequence, in particular the deep discharge characteristic of such an energy storage means is improved.

It was also surprisingly discovered that due to the indicated measures, especially the acid treatment, a further very positive effect was also achieved. The separator materials that are these days customarily used, for example the indicated PE-foil with silica embedments, tend to shrink during processing due to the absorption of moisture and the subsequent drying. It was surprisingly discovered that the inventive acid treatment of the present invention counteracts shrinkage of the separator material. This also provides a simple possibility for detecting the use of the inventive method.

The inventive method can easily and with straightforward technical means be used during the manufacture of the separator material or during a subsequent processing step. The separator material that is produced in accordance with the present invention considerably improves the electrochemical properties of energy storage means.

The specification incorporates by reference the disclosure of priority documents German patent application 196 27 614.4 of Jul. 9, 1996, international patent application PCT/EP97/02019 of Apr. 22, 1997, and U.S. patent application Ser. No. 09/029,944 of Mar. 9, 1998.

The present invention is, of course, in no way restricted to the specific disclosure of the specification, but also encompasses any modifications within the scope of the appended claims.

What we claim is:

1. A method for producing lead-acid accumulators having a separating material, wherein said separating material is a porous polyethylene film with silica embedments, the method comprising the steps of:

treating said separating material before fitting into a cell with at least one acid selected from a group consisting of sulfuric, phosphoric, and sulfonic acids and/or at least one salt selected from the group consisting of sulfates, phosphates, and diphosphates of alkaline or alkaline-earth metals to reduce an ion migration through the porous separating material and/or reduce an ion concentration in the separator material, whereby one of said at least one acid or said at least one salt is incorporated in said separating material.

2. A method according to claim 1, wherein the at least one acid or the at least one salt remains chemically unbound to the separator material during the treating step.

3. A method according to claim 1, wherein the treating step results in a chemical residuum being formed on the film.

4. A method according to claim 3, wherein the treating step resulting in a chemical residuum includes a sulfate.

5. A method according to claim 1, wherein one of the alkaline metals is sodium.

6. A method according to claim 1, wherein one of the alkaline-earth metals is magnesium.

7. A method according to claim 1, wherein said separating material is impregnated with said at least one acid or said at least one salt.

8. A method according to claim 1, wherein said separating material is immersed in one of said at least one acid or said at least one salt.

* * * * *